United States Patent [19]

McSorley, Sr. et al.

[11] Patent Number: 4,607,437

[45] Date of Patent: Aug. 26, 1986

[54] ADJUSTABLE LEVEL

[76] Inventors: Harry J. McSorley, Sr., 1717 S. Washington, Wichita, Kans. 67211; Sophokles Anthimides, 219 E. Douglas, Wichita, Kans. 67202

[21] Appl. No.: 696,970

[22] Filed: Jan. 31, 1985

[51] Int. Cl.⁴ .............................................. G01C 9/00
[52] U.S. Cl. ..................................... 33/374; 33/381; 33/391; 33/375
[58] Field of Search ................ 33/374, 365, 375, 376, 33/379, 380, 381, 383, 161, 391

[56] References Cited

U.S. PATENT DOCUMENTS

| 457,992 | 8/1891 | Gillette | 33/375 |
| 832,326 | 10/1906 | Kleinbauer | 33/374 |
| 1,029,744 | 6/1912 | Desilets | 33/374 |
| 2,691,829 | 10/1954 | Arana | 33/374 |
| 2,692,440 | 10/1954 | Walters | 33/374 |
| 2,743,528 | 5/1956 | Posthauer, Sr. | 33/375 |
| 2,879,606 | 3/1959 | Olivere | 33/374 |
| 3,104,477 | 9/1963 | Edwill | 33/374 |
| 3,161,964 | 12/1964 | Myles | 33/161 |
| 3,811,197 | 5/1974 | Moore et al. | 33/374 |

FOREIGN PATENT DOCUMENTS 23675 of 1897 United Kingdom ................. 33/375

Primary Examiner—Willis Little
Attorney, Agent, or Firm—Henderson & Sturm

[57] ABSTRACT

An adjustable level apparatus (10) comprising a core level unit (11) provided with a pair of extension arm units (12) that are formed by upper (25) and lower (26) housing casings that are connected together through the core level unit (11), and the extension arm units (12) are further provided with extension leg units (13) on their ends, having an extension leg that is extendable perpendicular to the axis of reciprocation of the extension arm units (12) on the core level unit (11).

1 Claim, 9 Drawing Figures

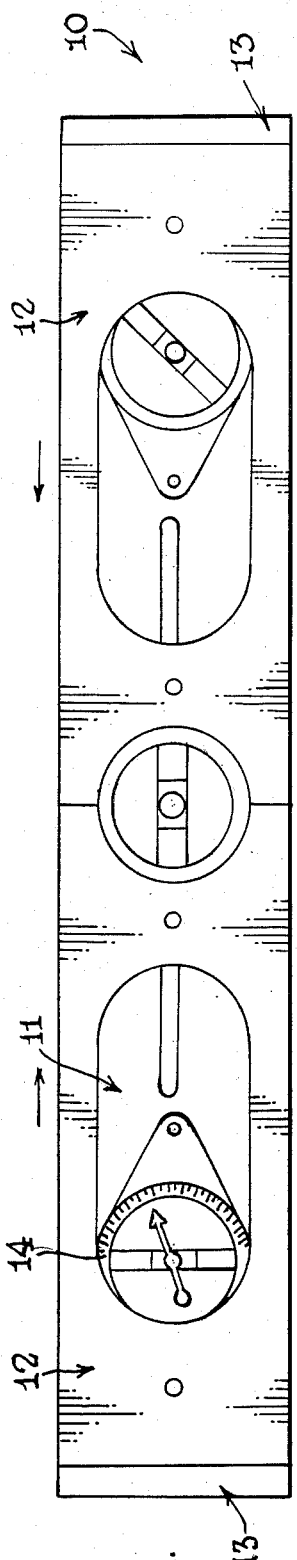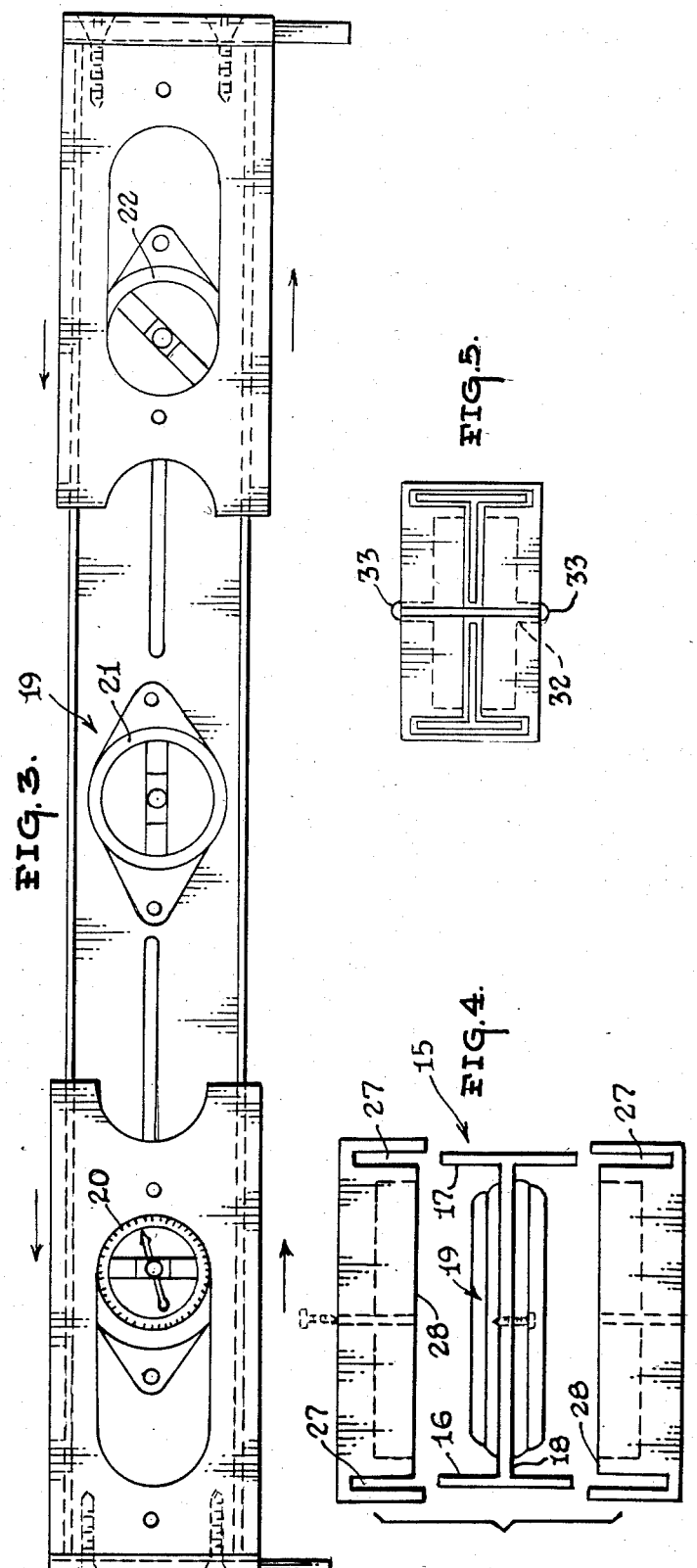

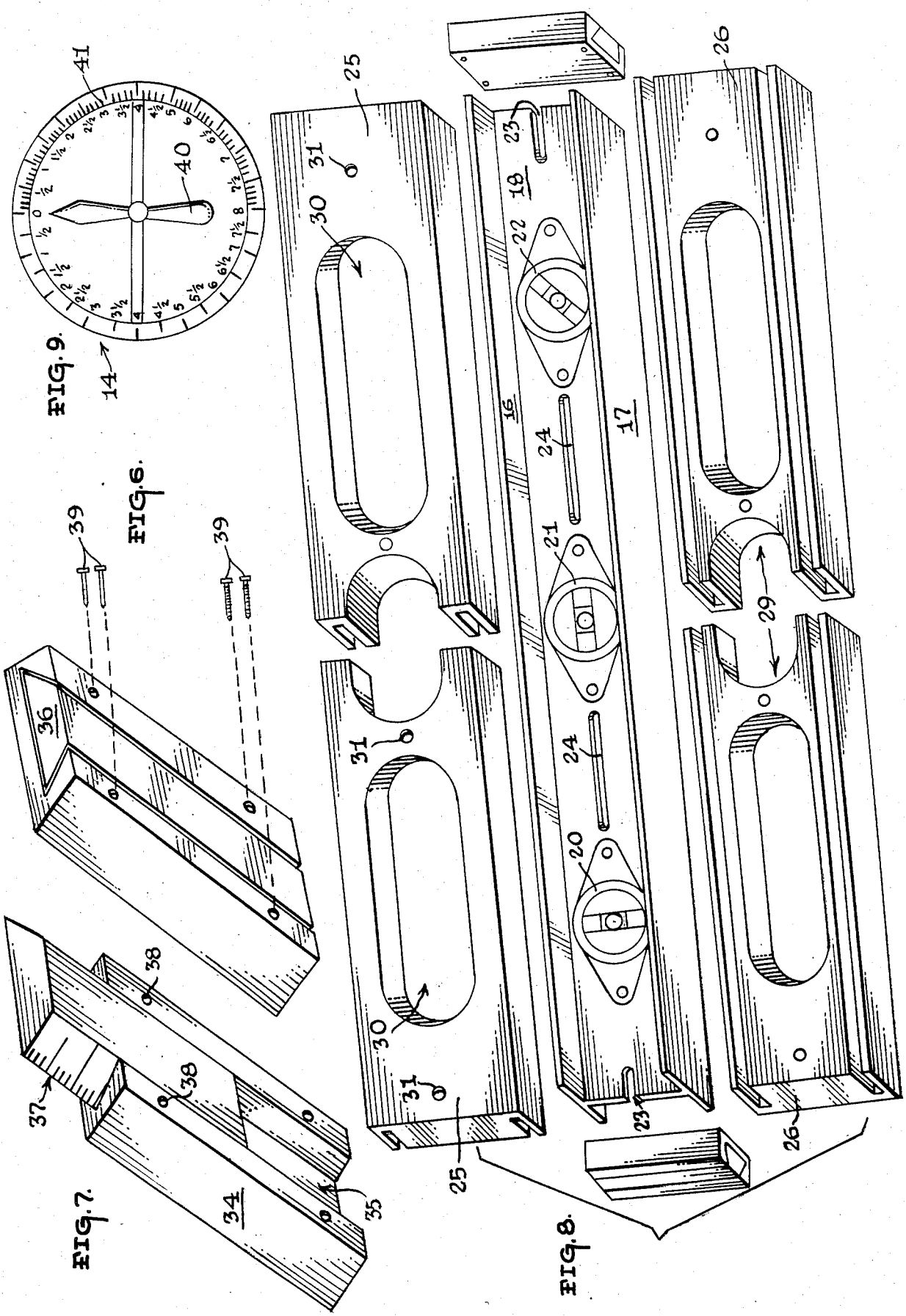

4,607,437

ADJUSTABLE LEVEL

TECHNICAL FIELD

This invention relates in general to multi-bubble carpentry levels used to indicate, horizontal, vertical and angular disposition of surfaces.

BACKGROUND ART

Various attempts have been made in the past to develop carpentry levels that can be used to align surfaces relative to one another and also determine the angle, that certain surfaces are disposed with respect to the horizontal and/or vertical plane.

Some of the prior art devices that have been developed comprise nothing more than elongated rigid tools having a plurality of bubble elements and other angular indicating means associated therewith.

Other prior art devices employ a spirit level that is laterally or vertically translatable along a flat edged support member.

Still other prior art devices employ split body levels devices, wherein the level sections are pivotally secured to one another.

Yet other prior art devices employ adjustable length single spirit level apparatus, having pivoted legs disposed on the ends of the adjustable sections, so as to elevate the spirit level and give an accurate indication of the angle of slope between the two supported ends.

Examples of some of the aforementioned prior art devices may be seen by reference to the following U.S. Pat. Nos.: 2,691,829; 1,029,744; 832,326; and, 2,692,440.

While all of the above cited references are adequate for their intended purposes, they leave a lot to be desired from the standpoint of being an all around multipurpose carpenters level. In particular, these devices did not have the requisite versatility or ease of operation that would have gained them the immediate and widespread acceptance in the carpentry trade that they presently lack, both singularly and collectively.

DISCLOSURE OF THE INVENTION

The above stated shortcomings are substantially resolved by the provision of the instant invention. The instant invention includes generally a core level unit, extension arm units, extension leg units, and an inclinometer unit.

The core level unit comprises a multi-bubble level apparatus.

The extention arm units comprise housing casing, that are attached to the core level unit in a reciprocating fashion, to effectively increase the length of the core level unit.

The extension leg units are reciprocably disposed in the housing casings to form discretely adjustable support legs for the core level unit when it is rotated 90°. The extension legs, when used in conjunction with the adjustable casings, allow the core level unit to be suspended over warped surfaces, so that level surfaces may be formed above the warped surface.

The inclinometer unit comprises a weighted indicator operatively associated with the core level unit and, rotatably and centrally suspended with respect to circular indicia representative of roof pitch in fraction of inches per lineal foot.

The instant invention is therefore laterally adjustable in its normally flat disposition, laterally and vertically adjustable in its "on-edge" disposition, and provides a variety of usages not possible with the existing prior art constructions.

BRIEF DESCRIPTION OF THE DRAWINGS

These and other attributes, and novel features of the invention will become more clear upon a thorough study of the following description of the best mode for carrying out the invention, particularly when reviewed in conjunction with the drawings, wherein:

FIG. 1 is a top elevational view of the apparatus in its collapsed mode;

FIG. 2 is a side elevational view of the apparatus in its collapsed mode;

FIG. 3 is a side elevational view of the apparatus in its fully extended mode, and rotated 90° from the view illustrated in FIG. 1;

FIG. 4 is an exploded end view of the housing casing and core level unit assembly;

FIG. 5 is a cross sectional view of the assembled housing casing and core level unit FIG. 6 is a perspective view of one of the extension leg units in its retracted position;

FIG. 7 is a perspective view of the one of the extionsion leg unit in its extended position FIG. 8 is an exploded perspective view of the apparatus FIG. 9 is a detailed view of the inclinometer.

BEST MODE FOR CARRYING OUT THE INVENTION

Referring now to the drawings, and in particular to FIG. 8, the apparatus may be seen as depicted generally by the numeral 10. The apparatus (10) includes generally a core level unit (11) extension arm units (12), extension leg units (13), and an inclinometer unit (14). Each of these units will now be described in seriatim fashion.

The core level unit (11) comprises a generally H-shaped core element (15) having two elongated vertical wall members (16) and (17) connected together by an apertured, elongated horizontal intermediate wall member (18). The intermediate wall member (18) is further provided with a plurality of enlarged recesses (not shown) that are dimensioned to receive a plurality of spirit level indicators designated generally as (19), that are disposed along the running length of the horizontal wall member (18).

In the preferred embodiment illustrated, the horizontal wall member is provided with three distinct spirit level indicators, (20),(21) and (22) that are disposed proximate to, but spaced from, the ends of the horizontal wall member, and also at the midpoint of the horizontal wall member. One of the three distinct spirit indicators (19) is a horizontal level indicator, another is a vertical level indicator, and the remaining one is an angular indicator or inclinometer.

The particular arrangement of the three distinct level indicators (20), (21) and (22) is not considered to form part of this invention; however, it should be noted that it is considered to be a standard practice to dispose the horizontal level indicator in the center of a multi-bubble level array.

The horizontal wall member (18) is further provided with relatively short apertures (23) extending inwardly from each end, and relatively elongated apertures (24) disposed proximate its ends, and intermediate the various spirit level indicators (20), (21) and (22). The purpose and function of these apertures (23) and (24) will be discussed in greater detail further on in the specification.

The extension arm units (12) are disposed on the ends of the core element (15) and each of the extension arm units (12) comprise an upper elongated housing element (25) and (26) are generally rectangular in shape and are provided with a pair of elongated grooves (27) that are disposed proximate the sides, and running along the entire length of each housing element.

As shown in FIG. 4 the elongated grooves (27) are dimensioned to slidingly receive potions of the vertical wall members (16) and (17) of the core element (15). In addition a stepped recess (28) is formed between the elongated grooves (27) to accommodate the thickness of the horizontal wall member (18) of the core element (15) as shown in FIG. 5.

As can best be seen by reference to FIG. 8 each housing element (25), (26) is further provided with a semicircular aperture (29) on its inboard end and enlarged generally eliptical aperture (30) disposed proximate the mid-point of each housing element. The semi-circular recess (29) is dimensioned to conform to one-half of the intermediate spirit level (21), and the eliptical apertures (30) are dimensioned to receive and allow limited relative motion between the assembled housing elements, and the spirit levels (20) and (22) disposed proximate the ends of the core element (15).

In addition to the aforementioned structure, each of the housing elements (25) and (26) is provided with a plurality of small apertures (31) that are dimensioned to receive a plurality of elongated securing rods (32), that are provided with locking means (33) on their ends for securing the upper (25) and lower (26) housing elements together.

As shown in the drawings, one of the small apertures (31) is disposed intermediate the semi-circular recess (29) and the generally eliptical recess (30); and another small aperture is disposed proximate the free end of the housing elements (25), (26). When the housing elements are secured together, the elongated securing rods (32) extend through the relatively short (23) and relatively elongated (24) recesses that are formed in the horizontal wall member (18) of the core element (15); not only to secure the housing components (25), (26) together, but also to allow the extension are units (12) to reciprocate with respect to the core element 15. The extent of the aforementioned reciprocal movement being delineated by the length of the elongated recesses (24).

Each of the extension leg units 13 comprise in general an end plate element (34) adapted to be secured to the end of the assembled housing elements (25), (26), and further provided with an elongated dove tailed recess (35) dimensioned to slidingly receive an elongated tapered extension leg (36) having indicia markings (37) disposed along its tapered edges.

In addition to the aforementioned structure, the extension leg end plate element (34) is further provided with a plurality of recesses (38) that are dimensioned to receive securing means (39) in the form of screw elements that secure the extension legs (13) to the ends of the extension arms (12). While the securing means (39) has been indicated as screw elements, any suitable securing means, such as adhesives etc., would suffice.

As shown in FIG. 3, the axis of reciprocation of the extension leg units (13) is perpendicular to the axis of reciprocation of the extension arm units (12). This arrangement allows the extension arm units (12) to increase the effective length of the core level unit (11), and the extension leg units (13) can be used to vary the height of the core level unit (11). This latter feature is of particular importance, when the apparatus (10) is used in an environment wherein a warped surface must be spanned.

The inclinometer unit (14) is illustrated in FIG. 9, and comprises in general a weighted indicator element 40 rotatably and centrally disposed within a circular scale indicator (41), wherein the scale imprinted on the scale indicator (41) is representative of slope as expressed in inches per lineal foot. It should also be appreciated that while the inclinometer unit (14) is operatively connected to the apparatus (10), it may be disposed either on the horizontal wall member (18) of the level element 15, or on one of the extension arm units (12). As shown in the drawings, the inclinometer unit (14) will only produce a reading when the apparatus (10) is deployed in a mode wherein the extension legs (13) would be effective in elevating the apparatus (10) above a surface.

Having thereby described the subject matter of this invention it should be obvious that many substitutions, modifications and variations of the invention are possible in light of the above teachings. It is therefore to be understood, that within the scope of the appended Claims, the invention may be practiced otherwise than as specifically described.

What I claim is:

1. An adjustable level apparatus consisting of:
    an elongated core level unit provided with a plurality of spirit levels, and having an elongated aperture disposed proximate to, but spaced from, each end of said core level element; wherein said core level unit comprises a generally H-shaped core level element having two vertical wall members and an intermediate horizontal wall member; and said plurality of spirit levels comprises three distinct spirt levels, one of which is disposed at the midpoint of the horizontal wall member, and the remaining two of which are disposed proximate to, but spaced from, the ends of said horizontal wall member;
    a pair of extension arm units disposed on the ends of the core level unit, and mounted for reciprocation along the elongated axis, thereof; wherein said extension arm units comprise: an upper housing element; a lower housing element; and, at least one elongated securing rod that extends through one of said elongated apertures in the said core level unit, and connects the upper and lower housing elements to one another; wherein, both of the upper and lower housing elements are identical in construction and each housing element is further provided with a semi-circular aperture on its inboard end, and an enlarged generally eliptical aperture disposed proximate its mid-point, wherein the enlarged generally eliptical apertures are dimensioned to receive and allow limited relative motion between the assembled housing elements by virtue of the ends of the enlarged generally eliptical apertures coming into stop limiting contact with the said two spirit levels which are disposed proximate to, but spaced from the ends of said horizontal wall member on said elongated core level unit; and,
    an extension leg unit secured to each extension arm unit, and having an extension leg element that is reciprocal with respect to each extension arm unit in a direction perpendicular to the elongated axis of the core level unit.

* * * * *